United States Patent [19]
Siebel

[11] 3,936,668
[45] Feb. 3, 1976

[54] APPARATUS FOR VIEWING THE UNDERSIDE OF VEHICLES

[76] Inventor: Frederick Siebel, Puritan Road, Rye, N.Y. 10580

[22] Filed: May 3, 1974

[21] Appl. No.: 466,816

[52] U.S. Cl. .................................. 240/4.2; 350/301
[51] Int. Cl.² ........................................ F21V 33/00
[58] Field of Search ............. 240/2.18, 4.2; 350/301

[56] References Cited
UNITED STATES PATENTS

| | | | |
|---|---|---|---|
| 1,300,901 | 4/1919 | Warner | 350/301 |
| 2,188,677 | 1/1940 | Dickinson | 350/301 X |
| 2,580,699 | 1/1952 | Pfetzing | 240/4.2 X |
| 3,452,189 | 6/1969 | Lowery | 240/2.18 |
| 3,498,696 | 3/1970 | Kirby | 350/301 X |

FOREIGN PATENTS OR APPLICATIONS

| | | | |
|---|---|---|---|
| 110 | 12/1915 | United Kingdom | 350/301 |

Primary Examiner—Richard M. Sheer

[57] ABSTRACT

Apparatus for viewing the underside of vehicles, having a horizontal frame, in which a pair of mirrors are located in periscope fashion. A second frame member is hinged to the first so as to be foldable with respect to it from a closed position overlying the first frame to a second position extending vertically above one of the mirrors. The second frame is box-like and is open at each end to provide a viewing tower. Means to transport the apparatus is provided, and as well as lights to illuminate the object viewed.

6 Claims, 8 Drawing Figures

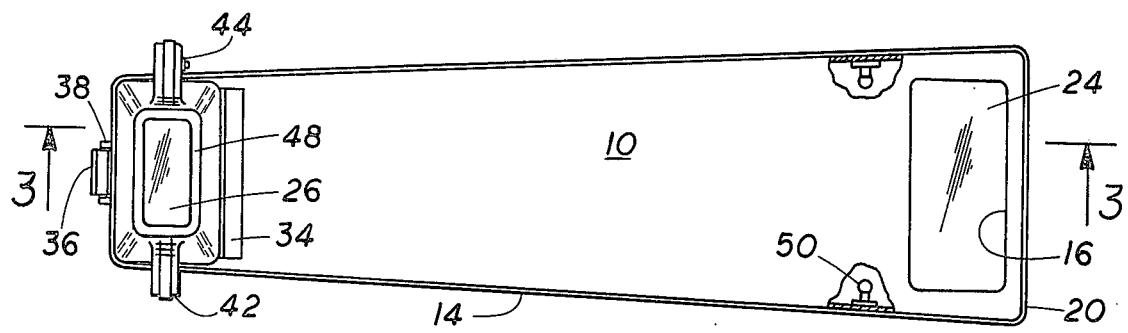
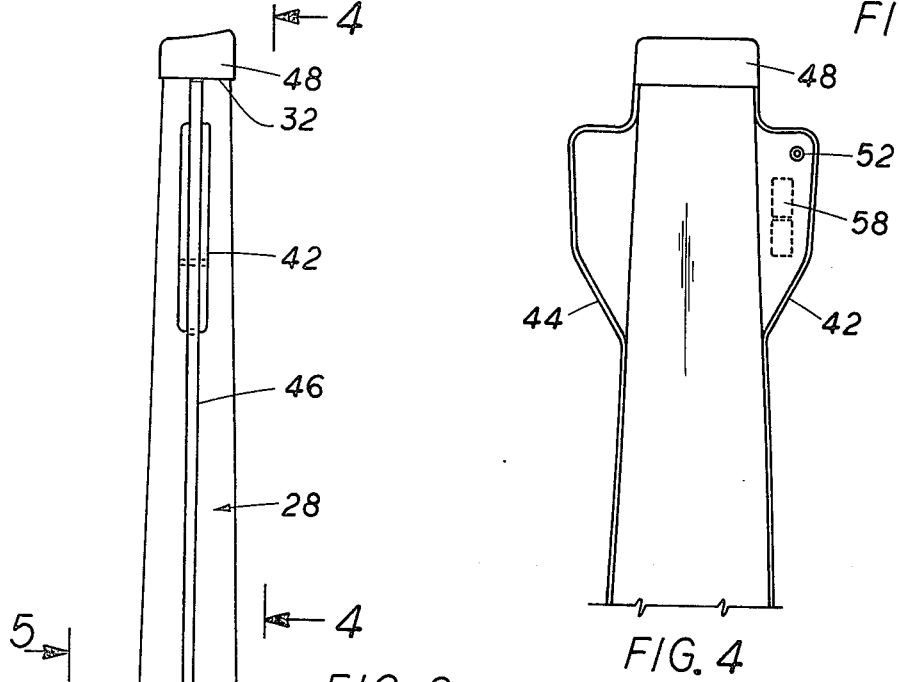
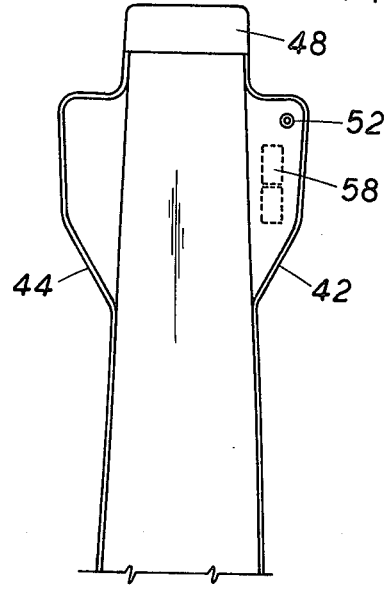
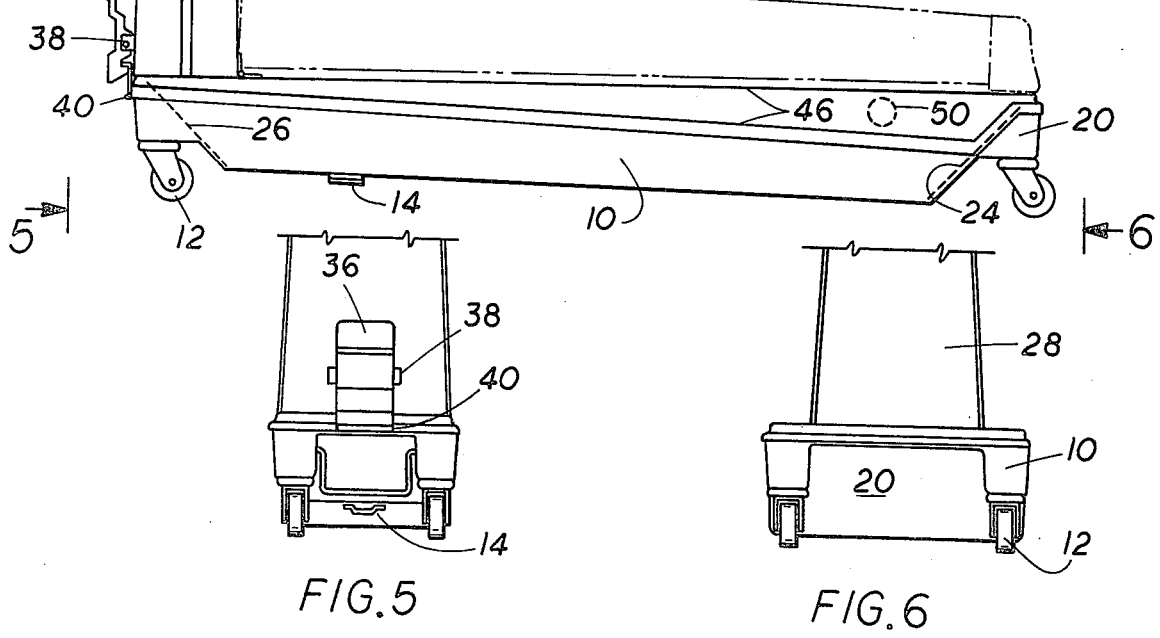
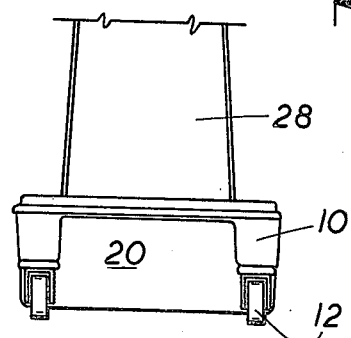

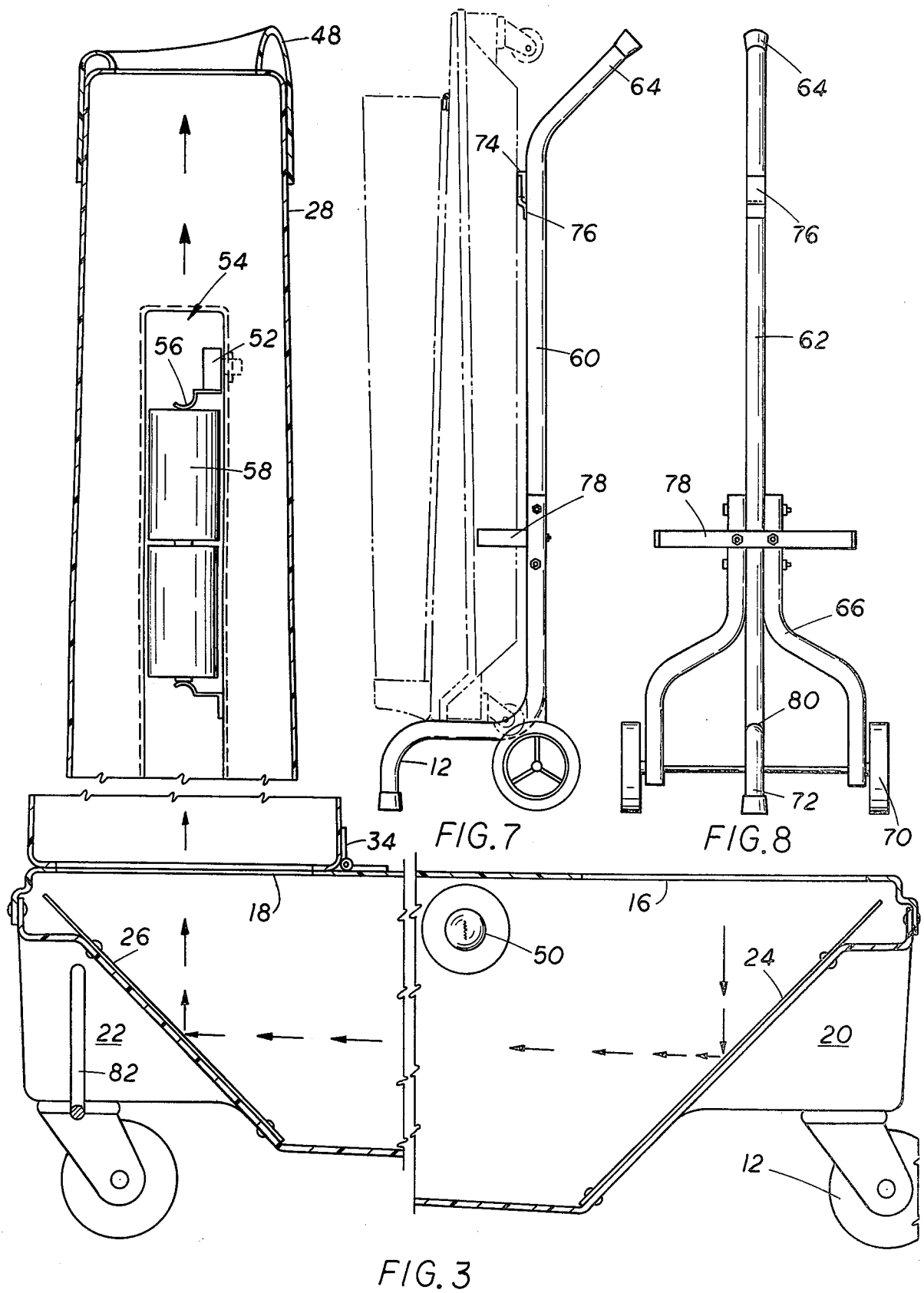

APPARATUS FOR VIEWING THE UNDERSIDE OF VEHICLES

BACKGROUND OF THE INVENTION

The present invention relates to apparatus for viewing the underside of vehicles such as motor cars, trucks, buses etc.

The inspection of the undercarriage of motor cars, in particular, is necessary to determine its safe operating condition and to locate defective parts, or the source of operating difficulties. While it has been common to make such inspections after the vehicle is elevated on a lift or jack it is frequently impossible or inconvenient to do so. Often vehicles break down in places remote from lifts or where jacks cannot be used. More importantly placing a truck or car, for example, on a lift or jack requires time as well as considerable effort. The alternative to the use of jacks or lifts, is for the inspector or mechanic to crawl on all fours beneath the vehicle. This is not any simpler or easier, and is far more onerous.

It is the object of the present invention to provide apparatus for viewing the undercarriage of a vehicle simply and swiftly.

It is a further object of the present invention to provide apparatus for remotely viewing the undercarriage of a vehicle where the inspector may stand erect and not have to alternatively lift the car or crawl beneath it.

It is a particular object of the present invention to provide apparatus for viewing the undersurface of a vehicle employing a periscope device insertable beneath the vehicle and which provides illumination for the undercarriage and which is easily manipulated beneath the length of the vehicle.

The foregoing objects, others as well as numerous and advantages of the present invention will be apparent from the following disclosure of the present invention.

SUMMARY OF THE INVENTION

According to the present invention an elongated horizontal box-like frame is provided with openings on its upper surface adjacent its forward and rear ends beneath each of which is placed a mirror. The mirrors face each other and are tilted upwardly through the apertures. Attached adjacent the rearward end of the horizontal frame is a second box-like frame open at each of its ends. The second frame is attached to the horizontal frame by a hinge which permits it to fold with respect to the horizontal frame from a closed position overlying the horizontal frame and in close proximity to it, to an open position in which the second frame towers substantially vertically above it and in which its open ends are aligned with the mirror aperture at the rearward end of the horizontal frame.

The horizontal frame is provided with wheels secured to its bottom so as to make it easily maneuverable in its open position. In its open position the second frame forms a sighting tower through which the operator, such as inspector or mechanic can sight through to the mirrors in the horizontal frame, which form a periscopic assembly. The forward end of the horizontal plane can be moved beneath the car to sight any part directly above it.

Preferably, the apparatus is provided with a separable dolly by which it may be transported and stored.

Further, the apparatus is provided with a light source comprising lights located along the inside walls of horizontal frame member between the front and rear mirrors. The lights are reflected by the forward mirror upward against the undercarriage of the vehicle to illuminate it. Preferably, the source of power for the lights consist of batteries housed in either of the frame members, and a switch is provided on the upper end of the second frame member easily convenient for manipulation.

Full details of the present invention are disclosed in the following description and are illustrated in the accompanying drawings.

BRIEF DESCRIPTION OF DRAWINGS

In the drawings:

FIG. 1 is a plan view of the apparatus of the present invention in open position, FIG. 2 is a side elevation view of the present apparatus in open position, showing also its closed position in dotted lines, FIG. 3 is a sectional view along line 3—3 of FIG. 1, greatly enlarged and in part broken away, FIG. 4 is front view taken in the direction of line 4—4 of FIG. 2 showing the second frame or tower member, FIG. 5 is a rear view taken in the direction of line 5—5 showing the rear end of the apparatus, FIG. 6 is a front view in the direction of line 6—6 showing the extreme front end of the horizontal frame member, FIG. 7 is a side elevation view showing the apparatus and transport dolly, and FIG. 8 is a rear view of the transport dolly.

DESCRIPTION OF THE INVENTION

The present apparatus, as seen in FIGS. 1 - 3 comprises a base, generally depicted by the numeral 10, comprising a hollow box-like elongated frame, provided with casters 12 at its front and rear ends so that it may be supported on a floor in a substantially horizontal plane. The exact overall shape of the horizontal base frame 10 may be closed as desired. Preferably, a suitable shape is a modified rectangle. The upper wall 14 of the horizontal base frame 10 is provided with apertures 16 and 18 adjacent the forward end and rearward end 20 and 22 respectively. Located beneath each of the apertures 16 and 18 respectively, is a mirror 24 and 26. The mirrors 24 and 26 face each other and are tilted at a substantially 45° angle to sight upwardly through the respective apertures 16 and 18.

As seen in FIGS. 2 and 3, the forward and rearward walls 20 and 22 of the horizontal base frame 10 are cut inwardly at the 45° angle so as to provide a flat secure supporting surface for the mirrors. This makes suitable and simple design, not requiring any special support or clamp for the mirrors. Of course, the shape may be varied and more conventional bracket supports for the mirrors can be used if desired.

Disposed to provide a tower above the rear aperture 18 is a second hollow frame member, generally depicted by the numeral 28, which is opened at its longitudinally extreme ends 30 and 32 respectively. The tower 28 is secured to the base frame member 10 by an elongated hinge 34 decured at its lower end 30 and at the forward edge of the rear aperture 18 of the base frame member 10. A piano type hinge is preferred although other hinge means may be used if desired. The tower 28 is thus permitted to swing, as seen in FIG. 2, from a substantially vertical open position (full lines) in which the open ends 30 and 32 are directly aligned with the rear mirror 26 and a closed position (dotted lines) in which it is folded over and into contiguous proximity with the upper wall 14 of the horizontal base frame member. The contiguous surfaces of the base frame member 10 and the tower 28 can be designed to fit closely to form a compact closed assembly.

The tower 28 is held in open position by latch means comprising a manually manipulatable spring loaded hook 36 pivotally secured about a pin 38 journalled on the face of the tower opposite the face to which the hinge 34 is secured. The hook 36 engages a striker 40 secured to the rear end 22 of the horizontal base frame 10. Extending outwardly of each of the lateral sides of the tower 28 is a wing-like structure 42 and 44 forming handles, by which the apparatus can be manipulated in either open or closed position.

As seen clearly in FIG. 3, the end of the lower end 30 of the tower fits snugly about the perimeter of the rear aperture 18 when in open condition and held fast by the latch so that the horizontal hollow base frame 10 and the hollow tower frame 28 provide substantially enclosed bodies into which stray light is precluded. Preferably, the frame members are both made from a pair of molded or extruded plastic sections which are provided with longitudinal outward extending flanges 46 which are preferably riveted together but may be welded, glued or otherwise fastened together to make strong rigid elongated hollow bodies. If desired the plastic sections may be reinforced with transverse or longitudinal ribs for added strength. Instead of plastic other suitable material such as wood or metal may be used. The mirrors 24 and 26 are aligned along a horizontal axis with each other, and extend transversely across the horizontal base member in parallel axes to each other, so that a sight line indicated by the arrows in FIG. 2 can be obtained simulating a simple periscope in which the image objective is received on the forward mirror 24 and transmitted via the rear mirror 26 upwardly through the hollow tower 28. To facilitate viewing the upper end of the tower 28 is provided with a bonnet 48 which conforms generally to the shape of the head adjacent the eyes. The bonnet 48 may be padded as well.

To facilitate illumination of the object viewed such as any part of the undercarriage of a vehicle, lights, such as bulbs 50, are mounted on the inner side walls of the base frame member 10 adjacent the front mirror 24, but between the front mirror and the rear mirror 26. In this manner the light is reflected upwardly by the front mirror 24 without interfering with the sight on view of the operator through the rear mirror. The lights are connected by suitable wiring to a source of power via a switch 52 mounted on the right hand wing handle 42. The switch may, of course, be on either wing. While the power source may be conventional house current it is preferred that it be battery power. Accordingly, the wing handle 42 is provided with a cavity 54 as seen in FIG. 3, and is provided with a pair of spaced spring contact supports 56 in series with the switch 52, in which a suitable number of batteries 56 are held. Preferably, the switch is mounted on the forward face of the wing so as to be more easily manipulated by the finers of the operator, as he holds the wings during viewing. The lights may be connected to the power source by the stretching of wire through the hollow frame members, in conventional manner. However, to avoid any breakdown caused by abrasion or excessive flexing of the wire when the tower 28 is swung into open or closed position, a solid state contact may be used in which one or more knife-like blades slide against spring loaded contact jaws, much in the manner of a toggle switch. In another form a V-shaped contact member secured to the tower 28 may be made conjointly swingable with it into engagement with a fixed plate contact secured to the upper wall 14 of the base frame 10. These types of contact can also insure against the excessive use of the battery power, since they can be made to automatically open when the tower is folded into closed position. The cavity 54 in the wing is provided with a removable cover, permitting easy access to the batteries, so that they can be readily changed.

While, the apparatus is readily movable on the floor, the closed assembly of tower 28 and base frame 10 is more difficult to transport or to store. To facilitate such transport, a caddy or dolly, generally depicted in FIGS. 7 and 8 by the numeral 60 is provided. The dolly comprises an elongated pole 62 having a handle 64 at its upper end and yoke 66 at its lower end in which an axle 68 is journalled. The axle holds a pair of wheels 70 while a foot member 72 is secured to the yoke 66, providing a tripod stable footing. To secure the apparatus to the caddy dolly the lower wall of the horizontal base member 10 is provided with a loop or metal strap 74 which engages over a hook 76 fixed in corresponding position on the pole 62 of the caddy dolly. The dolly is also provided with a U-shaped bracket 78 which substantially encircles the closed apparatus. The foot 72 of the dolly is bent outwardly to form a resting bracket 80 for the rear end 22 of the base frame 10, with the casters 12 entrapped between the yoke 66. To facilitate further handling, a wire handle 82 is provided at the rear end 22 by which the apparatus may be easily picked up.

What is claimed is:

1. Apparatus for viewing the underside of a vehicle comprising a elongated hollow first frame member having front and rear ends and upper and lower surfaces, said upper surface having an aperture formed adjacent at least each of its extreme forward and rearward ends, and means secured to the lower surface for movably supporting said first frame member in a horizontal plane upon a floor, a mirror located beneath each of the apertures facing each other and disposed at an angle to sight through said apertures, a elongated hollow second frame member having upper and lower surfaces interconnected by side walls, said second frame member being open at each end, hinge means securing said second frame member to said first frame member, said hinge means having a first leaf secured to the upper surface of said first frame member adjacent the aperture formed at the rearward end thereof, a second leaf secured to the edge of said second frame member adjacent one end thereof and a pivot axis disposed transversely of said first frame member to permit said second frame member to swing with respect to said first frame member from a closed position substantially overlying said first frame member in a parallel plane thereof, to an open position substantially normal to the plane of said first frame member, said one end of said second frame member being in alignment with the aperture at the rearward end of said first frame member to form an enclosed optical path through said first frame member and said second frame member to the other end of said second frame member, a source of light disposed within said first frame adjacent the aperture at the frontal end of said first frame member and between said facing mirrors, a battery source of power for said lights disposed within one of said first and second frame members and switch means mounted on said second frame member controlling said source of light, said mirrors acting to reflect said source of light onto the undercarriage of said vehicle.

2. The apparatus according to claim 1 including means for transporting said frame members in closed position comprising a dolly having supporting wheels, a handle, and means for removably securing said frame members to said handle.

3. The apparatus according to claim 1 including a handle extending from each of the longitudinal sides of said second frame member adjacent the upper end thereof.

4. The apparatus according to claim 1 including latch means for removably securing said first and second frames in open position.

5. The apparatus according to claim 1 including a bonnet located over the outer end of said second frame member.

6. The apparatus according to claim 1 including optical enlarging means located in said second frame member.

* * * * *